Nov. 6, 1934.                A. H. REESE                1,979,666
                       WARMER FOR NURSING BOTTLES
                           Filed March 5, 1934
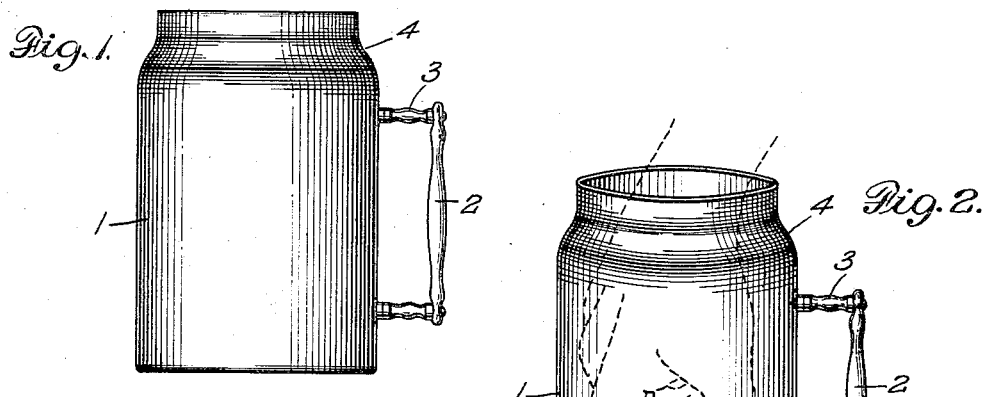
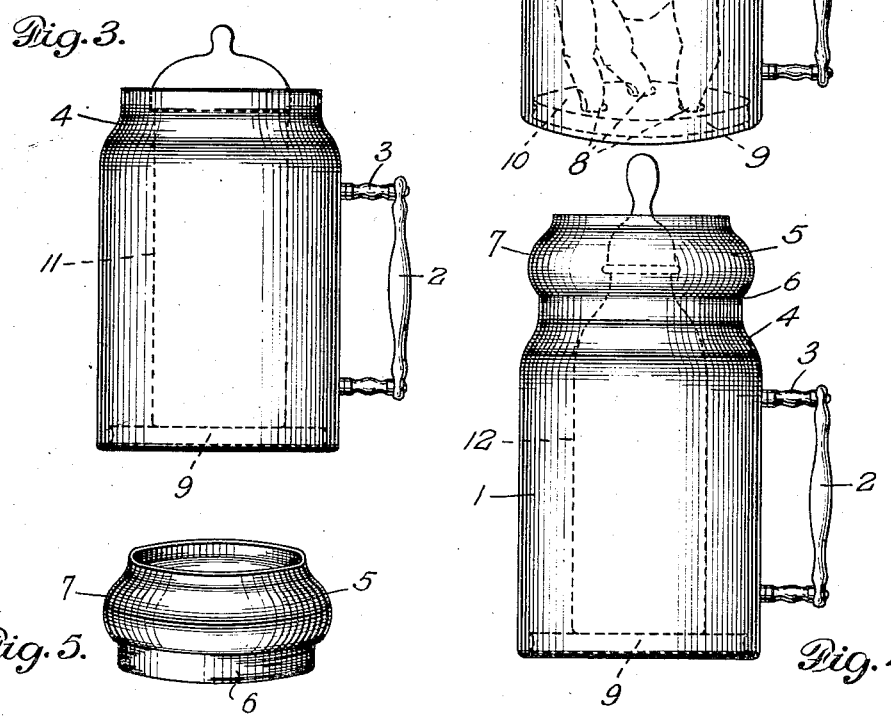
Anabel Hays Reese
INVENTOR
BY C. H. Lane
ATTORNEY Patented Nov. 6, 1934

1,979,666

UNITED STATES PATENT OFFICE 1,979,666

WARMER FOR NURSING BOTTLES

Anabel Hays Reese, Petersburg, Va., assignor of one-half to Leta J. White, Petersburg, Va.

Application March 5, 1934, Serial No. 714,185

4 Claims. (Cl. 126—261)

My invention relates to portable warmers for nursing bottles.

One of the objects of my invention is to provide a warmer for nursing bottles that is inexpensive, can be readily packed for traveling, and is simple in construction and operation; which may be used on or over any stove or heater, and which serves as a means for transporting the bottle and its contents, immersed in water, from the place of preparation to the heater, and from the heater to the room in which the milk is to be used.

Another object is to construct a warmer having a minimum number of parts, which parts may be easily replaced if damaged.

Another object is to provide a warmer that will not crack the bottle when heat is applied.

A further object is to provide a warmer adapted for efficient use upon bottles of different sizes and shapes, or upon two slender bottles.

Another object is to construct a warmer with a top opening which will admit the hand of the user to remove a false bottom, and a removable extension for the container having a smaller opening.

Another object is to provide a warmer that will surround either a tall or a short bottle, leaving the nipple projecting above into the outside air.

Still another object is to construct a false bottom having means whereby it may be easily removed and having means for governing the circulation of the heat transmitting medium.

Other objects are to protect the bottle against outside draft, to facilitate the cleaning of the warmer, to cause the water surrounding the bottle to be of substatnially uniform cross-section when it is at the same level as the milk, whether the bottle is full or partially empty, to prevent the deposit in inaccessible places of minerals or other impurities, and to avoid the use of an unnecessary quantity of water, thus economizing time and fuel or electric energy.

I attain these objects by means of the novel combinations and devices described and claimed in the following specification, and illustrated in the accompanying drawing, in which Fig. 1 is a side elevation of the container with the cover and false bottom removed;

Fig. 2 is a perspective view of the container and false bottom, showing the manner of removing the latter;

Fig. 3 is a side view of the container with a comparatively short nursing bottle resting on the false bottom;

Fig. 4 shows the container with the extension in place and a taller and narrower bottle enclosed;

Fig. 5 is a perspective view of the extension or cover to be placed on the container 1 as shown in Fig. 4, and Fig. 6 is a perspective view of the false bottom.

Similar numerals represent the same parts in all of the figures.

The container 1, shown in Figs. 1 to 4, is made preferably of aluminum, but other materials may be used if desired. It has a handle 2 of wood or other heat-insulating material supported by upper and lower arms or brackets 3 attached to the body of the container. The upper portion of the container is reduced in diameter, as shown at 4, and the body portion is preferably uniform in diameter from the reduced portion to the bottom, in order that the body of water surrounding the bottle may be of uniform cross-sectional area.

The open cover or extension is designated by the numeral 5. A collar or flange 6 at its lower edge fits into the opening of the container and the adjoining shoulder rests on the edge of the container mouth as shown in Fig. 4. Above the flange the extension is curved, as shown at 7, to gradually reduce the diameter of the extension above the enlargement near the flange 6. The extension, constructed as shown and described, effectually shields the bottle against drafts of cold air.

The false bottom 10 is preferably constructed of aluminum and has openings 8 of suitable size and conveniently arranged out of line with each other, as shown, to accommodate the thumb and two fingers of the user while removing the false bottom.

The reduced diameter of the container at its top makes the opening large enough to receive the user's hand, but small enough to retard the escape of heated air and steam, as shown in Fig. 3. The circumferential groove 9 in the disc or false bottom 10 is curved as shown in Fig. 6 to assist in circulating the water in the container.

Numeral 11, Fig. 3, designates a bottle known as the Hygeia. The container is of suitable height to surround the bottle, leaving the nipple exposed to the outer air where it will not be damaged by the heat within the receptacle. The nipple of the tall bottle of Fig. 4 projects in a similar manner beyond the extension.

In use the false bottom is placed within the container and the bottle upon the false bottom. Water is then poured into the container to the height of the liquid within the bottle and, if a tall bottle is used, the extension 5 is applied to the container. The container and contents may then be carried to the heater and warmed. When the water at the bottom begins to heat it rises, and is deflected by the curved groove 9 to assist in its circulation. This results in more uniform and gradual heating of the bottle. The gradual heating of the bottle, as well as the presence of the false bottom and the filling of the container with water to the level of the milk, serves to prevent cracking of the bottle. Filling the container only to the level of the milk also saves time in warming. Above the level of the water the vapor is sufficiently retarded by the restricted opening in the receptacle or its extension to prevent its too rapid escape. When the milk is properly heated it may be carried to the room where it is to be used without removing it from the receptacle and it may be kept in the hot water until preparations have been made for its use. After use of the warmer the water is poured out and the false bottom may be easily removed in the manner shown in Fig. 2. If the extension has been used, it must first be removed.

The three parts of which my invention is composed may be easily cleaned after separation from each other. The straight sides of the container make it easier to clean than would be the case if there were internal enlargements or cavities.

Where I specify in the claims that the cover is removable, I do not limit myself to one that is wholly detachable, or to any particular style of connection that permits complete or partial removal of the cover. A hinged, screw-threaded or any equivalent form of connection may be used.

What I claim is:

1. In a warmer for nursing bottles, the combination of a container for liquids, said container having a single central opening at its top, said opening being of suitable size to admit the hand of the user and the container being of suitable size and shape to surround and enclose a milk bottle, with a removable extension at the upper end of said container, said extension also having a single central opening at its top smaller than the opening in the container, to enclose a taller bottle with its nipple protruding through the opening in the extension.

2. In a warmer for nursing bottles, the combination of a container for liquids, said container having a single central opening at its top, and said container being reduced in diameter near its upper end, said opening being of suitable size to admit the hand of the user and the container being of suitable size and shape to surround and enclose a milk bottle, with a removable extension at the upper end of said container, said extension also having a single central opening at its top smaller than the opening in the container, to enclose a taller bottle with its nipple protruding through the opening in the extension.

3. In a warmer for nursing bottles, the combination of a container for liquids, said container having a single central opening at its top, the opening being of suitable size to admit the hand of the user, and the container being of suitable size and shape to surround and enclose a milk bottle, with a removable extension at the top of said container, said extension also having a single central opening at its top smaller than the opening in the container to enclose a taller bottle with its nipple protruding through the opening in the extension, and a false bottom having provisions for lifting it out of the container by hand.

4. A false bottom for containers comprising a flat disk-like member, the peripheral edge thereof being curved inwardly and downwardly and then outwardly and downwardly between the upper and lower surfaces thereof, whereby liquid is caused to circulate upwardly and outwardly in said container when heated.

ANABEL HAYS REESE.